United States Patent
Ma (10) Patent No.: US 9,344,419 B2
(45) Date of Patent: May 17, 2016

(54) METHODS OF AUTHENTICATING USERS TO A SITE

(71) Applicant: Veritrix, Inc., Palo Alto, CA (US)

(72) Inventor: Karen Ma, Sugar Land, TX (US)

(73) Assignee: K.Y. TRIX LTD., Kfar Mordechai (IL)

(*) Notice: Subject to any disclaimer, the term of this patent is extended or adjusted under 35 U.S.C. 154(b) by 71 days.

(21) Appl. No.: 14/192,865

(22) Filed: Feb. 27, 2014

(65) Prior Publication Data

US 2015/0244696 A1    Aug. 27, 2015

(51) Int. Cl.
| | | |
|---|---|---|
| H04L 29/06 | (2006.01) | |
| G06F 21/41 | (2013.01) | |
| H04L 9/32 | (2006.01) | |
| H04W 12/06 | (2009.01) | |

(52) U.S. Cl.
CPC ............ H04L 63/08 (2013.01); G06F 21/41 (2013.01); H04L 9/321 (2013.01); H04L 63/0815 (2013.01); H04L 63/10 (2013.01); H04W 12/06 (2013.01)

(58) Field of Classification Search
CPC ..... H04L 63/08; H04L 63/0815; H04L 63/10; H04L 9/321; G06F 21/41; H04W 12/06
See application file for complete search history.

(56) References Cited

U.S. PATENT DOCUMENTS

| | | |
|---|---|---|
| 5,033,088 A | 7/1991 | Shipman |
| 5,805,674 A | 9/1998 | Anderson, Jr. |
| 5,841,870 A | 11/1998 | Fieres et al. |
| 5,958,016 A | 9/1999 | Chang et al. |
| 6,009,442 A | 12/1999 | Chen et al. |
| 6,021,491 A | 2/2000 | Renaud |
| 6,035,403 A | 3/2000 | Subbiah et al. |
| 6,256,630 B1 | 7/2001 | Gilai et al. |

(Continued)

FOREIGN PATENT DOCUMENTS

| | | |
|---|---|---|
| CA | 2278549 A1 | 7/1998 |
| CA | 2399961 A1 | 4/1999 |

(Continued)

OTHER PUBLICATIONS

U.S. Appl. No. 14/012,542, Paul Headley, Single-Channel Multi-Factor Authentication, filed Aug. 28, 2013.

(Continued)

*Primary Examiner* — Tri Tran
(74) *Attorney, Agent, or Firm* — Peters Verny, LLP (57) ABSTRACT

Systems and methods for user authentication within federated computing systems are provided. In a session, a user can be authenticated multiple times by different authentication methods for different servers of the federated system, however, once the user has been authenticated by any given authentication method, the user need not repeat that method. Systems of the present invention comprise a plurality of servers including an authentication server. The authentication server maintains authentication records for users, where each record includes which authentication methods apply to which servers. When a user first seeks access to a particular server, the server identifies the user and the server to the authentication server. If the user has already been authenticated elsewhere according to the authentication method required by the new server, the authentication server indicates to the new server that the user is authenticated, else the authentication server invokes the necessary authentication method.

8 Claims, 2 Drawing Sheets

(56) References Cited

U.S. PATENT DOCUMENTS

| | | |
|---|---|---|
| 6,262,732 B1 | 7/2001 | Coleman et al. |
| 6,446,210 B1 | 9/2002 | Borza |
| 6,480,304 B1 | 11/2002 | Os et al. |
| 6,480,825 B1 | 11/2002 | Sharma et al. |
| 6,496,206 B1 | 12/2002 | Mernyk et al. |
| 6,496,595 B1 | 12/2002 | Puchek et al. |
| 6,501,966 B1 | 12/2002 | Bareis et al. |
| 6,519,561 B1 | 2/2003 | Farrell et al. |
| 6,529,885 B1 | 3/2003 | Johnson |
| 6,581,042 B2 | 6/2003 | Pare, Jr. et al. |
| 6,615,191 B1 | 9/2003 | Seeley |
| 6,671,672 B1 | 12/2003 | Heck |
| 6,697,947 B1 | 2/2004 | Matyas, Jr. et al. |
| 6,766,295 B1 | 7/2004 | Murveit et al. |
| 6,778,644 B1 | 8/2004 | Jenkins et al. |
| 6,819,219 B1 | 11/2004 | Bolle et al. |
| 6,886,095 B1 | 4/2005 | Hind et al. |
| 6,907,408 B2 | 6/2005 | Angel |
| 6,934,858 B2 | 8/2005 | Woodhill et al. |
| 6,944,772 B2 | 9/2005 | Dozortsev |
| 6,993,166 B2 | 1/2006 | Lo et al. |
| 7,149,721 B1 | 12/2006 | Sites et al. |
| 7,171,694 B1 | 1/2007 | Jespersen et al. |
| 7,240,363 B1 | 7/2007 | Ellingson |
| 7,277,891 B2 | 10/2007 | Howard et al. |
| 7,305,700 B2 | 12/2007 | Boynton et al. |
| 7,319,987 B1 | 1/2008 | Hoffman et al. |
| 7,333,635 B2 | 2/2008 | Tsantes et al. |
| 7,334,259 B2 | 2/2008 | Haala |
| 7,349,557 B2 | 3/2008 | Tibor |
| 7,352,868 B2 | 4/2008 | Hawkes et al. |
| 7,383,572 B2 | 6/2008 | Rolfe |
| 7,461,258 B2 | 12/2008 | Rolfe |
| 7,522,751 B2 | 4/2009 | White et al. |
| 7,545,961 B2 | 6/2009 | Ahern et al. |
| 7,545,962 B2 | 6/2009 | Peirce et al. |
| 7,617,522 B2 | 11/2009 | Schmidt et al. |
| 7,634,662 B2 | 12/2009 | Monroe |
| 7,647,498 B2 | 1/2010 | Brown et al. |
| 7,676,439 B2 | 3/2010 | Tattan et al. |
| 7,685,629 B1 | 3/2010 | White et al. |
| 7,689,833 B2 | 3/2010 | Lange |
| 7,690,032 B1 | 3/2010 | Peirce |
| 7,698,322 B1 | 4/2010 | Langley |
| 7,702,918 B2 | 4/2010 | Tattan et al. |
| 7,788,730 B2 | 8/2010 | Dean et al. |
| 7,797,545 B2 | 9/2010 | Adams et al. |
| 7,835,548 B1 | 11/2010 | Langley |
| 7,865,449 B2 | 1/2011 | Tattan et al. |
| 7,865,937 B1 | 1/2011 | White et al. |
| 7,941,380 B2 | 5/2011 | Tattan et al. |
| 7,987,495 B2 | 7/2011 | Maler et al. |
| 8,006,291 B2 | 8/2011 | Headley et al. |
| 8,166,297 B2 | 4/2012 | Headley |
| 8,185,646 B2 | 5/2012 | Headley |
| 8,220,034 B2 | 7/2012 | Hahn et al. |
| 8,266,443 B2 | 9/2012 | Errico |
| 8,295,898 B2 | 10/2012 | Ashfield et al. |
| 8,316,233 B2 | 11/2012 | Errico |
| 8,468,358 B2 | 6/2013 | Headley |
| 8,527,751 B2 | 9/2013 | Errico |
| 2002/0129251 A1 | 9/2002 | Itakura et al. |
| 2002/0152179 A1 | 10/2002 | Racov |
| 2002/0174347 A1 | 11/2002 | Ting |
| 2003/0005326 A1 | 1/2003 | Flemming |
| 2003/0140235 A1 | 7/2003 | Immega et al. |
| 2003/0149781 A1* | 8/2003 | Yared ............... G06F 21/41 709/229 |
| 2003/0159066 A1 | 8/2003 | Staw et al. |
| 2003/0163739 A1 | 8/2003 | Armington et al. |
| 2003/0169881 A1 | 9/2003 | Niedermeyer |
| 2003/0182194 A1 | 9/2003 | Choey et al. |
| 2003/0236978 A1 | 12/2003 | Evans et al. |
| 2004/0158723 A1 | 8/2004 | Root |
| 2004/0254868 A1 | 12/2004 | Kirkland et al. |
| 2005/0091338 A1 | 4/2005 | de la Huerga |
| 2005/0114705 A1 | 5/2005 | Reshef et al. |
| 2005/0204041 A1* | 9/2005 | Blinn et al. ............ 709/225 |
| 2006/0021009 A1 | 1/2006 | Lunt |
| 2006/0041755 A1 | 2/2006 | Pemmaraju |
| 2006/0129821 A1 | 6/2006 | Zugenmaier et al. |
| 2006/0136219 A1 | 6/2006 | Wang |
| 2006/0136744 A1 | 6/2006 | Lange |
| 2006/0184800 A1 | 8/2006 | Rosenberg |
| 2006/0194592 A1 | 8/2006 | Clough |
| 2006/0212717 A1 | 9/2006 | Ito et al. |
| 2006/0245619 A1 | 11/2006 | Sathath |
| 2007/0055517 A1 | 3/2007 | Spector |
| 2007/0061590 A1 | 3/2007 | Boye et al. |
| 2007/0073776 A1 | 3/2007 | Kalalian et al. |
| 2007/0079360 A1 | 4/2007 | Roberts et al. |
| 2007/0107016 A1 | 5/2007 | Angel et al. |
| 2007/0107017 A1 | 5/2007 | Angel et al. |
| 2007/0107021 A1 | 5/2007 | Angel et al. |
| 2007/0136573 A1 | 6/2007 | Steinberg |
| 2007/0169182 A1 | 7/2007 | Wolfond et al. |
| 2007/0175986 A1 | 8/2007 | Petrone et al. |
| 2007/0198435 A1 | 8/2007 | Siegal et al. |
| 2007/0226516 A1 | 9/2007 | Kubota et al. |
| 2007/0226787 A1 | 9/2007 | Maletsky et al. |
| 2007/0260883 A1 | 11/2007 | Giobbi et al. |
| 2008/0052245 A1 | 2/2008 | Love |
| 2008/0052527 A1 | 2/2008 | Siedlarz |
| 2008/0077524 A1 | 3/2008 | Greene |
| 2008/0077525 A1 | 3/2008 | Willey et al. |
| 2008/0077526 A1 | 3/2008 | Arumugam |
| 2008/0086319 A1 | 4/2008 | Berger |
| 2008/0086764 A1 | 4/2008 | Kulkarni et al. |
| 2008/0091618 A1 | 4/2008 | Obrea et al. |
| 2008/0109657 A1* | 5/2008 | Bajaj et al. ............ 713/168 |
| 2008/0113786 A1 | 5/2008 | Alderucci et al. |
| 2008/0141353 A1 | 6/2008 | Brown |
| 2008/0307515 A1 | 12/2008 | Drokov et al. |
| 2009/0021349 A1 | 1/2009 | Errico et al. |
| 2009/0052745 A2 | 2/2009 | Sathath |
| 2009/0116703 A1 | 5/2009 | Schultz |
| 2009/0119299 A1 | 5/2009 | Rhodes |
| 2009/0164796 A1 | 6/2009 | Peirce |
| 2009/0259588 A1 | 10/2009 | Lindsay |
| 2009/0313165 A1 | 12/2009 | Walter |
| 2010/0022254 A1 | 1/2010 | Ashfield et al. |
| 2010/0029196 A1 | 2/2010 | Tan |
| 2010/0039218 A1 | 2/2010 | Cohen et al. |
| 2010/0100591 A1 | 4/2010 | Mahaffey et al. |
| 2010/0107230 A1 | 4/2010 | Tyagi et al. |
| 2010/0211996 A1 | 8/2010 | McGeehan et al. |
| 2010/0306533 A1 | 12/2010 | Phatak |
| 2010/0312763 A1 | 12/2010 | Peirce |
| 2011/0035788 A1 | 2/2011 | White et al. |
| 2011/0185405 A1 | 7/2011 | Ganesan |
| 2011/0202466 A1 | 8/2011 | Carter |
| 2011/0209200 A2 | 8/2011 | White et al. |
| 2011/0231911 A1 | 9/2011 | White et al. |
| 2012/0328101 A1 | 12/2012 | Lakshminarayanan |
| 2013/0104219 A1 | 4/2013 | Kumar et al. |

FOREIGN PATENT DOCUMENTS

| | | |
|---|---|---|
| GB | 2379040 A | 2/2003 |
| WO | 0155819 A1 | 8/2001 |
| WO | 2001056352 A2 | 8/2001 |
| WO | 2009032036 A2 | 3/2009 |
| WO | 2009127984 A1 | 10/2009 |
| WO | 2010043722 A1 | 4/2010 |
| WO | 2010096628 A2 | 8/2010 |

OTHER PUBLICATIONS

U.S. Appl. No. 13/683,940, Paul Headley, Multi-Channel Multi-Factor Authentication, filed Nov. 21, 2012.

U.S. Appl. No. 13/442,232, Paul Headley, User Authentication for Social Networks, filed Apr. 9, 2012.

International Search Report and Written Opinion, PCT/US09/43363 (May 8, 2009), dated Jul. 16, 2009.

(56) References Cited

OTHER PUBLICATIONS

International Search Report and Written Opinion, PCT/US09/47049 (Jun. 11, 2009), dated Sep. 1, 2009.
International Search Report and Written Opinion, PCT/US09/48842 (Jun. 26, 3009, dated Aug. 3, 2009.
International Search Report and Written Opinion, PCT/US09/62490 (Oct. 29, 2009), dated Dec. 14, 2009.
International Search Report and Written Opinion, PCT/US11/58974 (Nov. 2, 2011), dated Mar. 16, 2012.
Vince Thomas et al., "Learning to Predict Gender from Iris Images," First IEEE International Conference on Biometrics: Theory, Applications, and Systems, Sep. 2007.
Jain et al., Soft Biometric Traits for Personal Recognition Systems, http://www.springerlink.com/content/5gg1c23821cevbnk/.
Ambalakat, Security of Biometric Authentication Systems, 2005, http://www.ewp.rpl.edu/hartford/~rhb/cs_seminar_2005/SessionA1/ambalakat.pdf.
EPO 09 747 255.9 European Supplementary Search Report, Jun. 28, 2012.
Chenafa, M. et al., Biometric System Based on Voice Recognition Using Multiclassifiers, "Biometrics and Identity Management," Springer Berlin, pp. 206-215, May 5, 2008.
Tan, T. G., "Phising Redefined—Preventing Man-in-the-Middle Attacks for Web-based Transactions," http://www.dssasia.com, Mar. 2005.
EP 12180301.9 Extended European Search Report, dated Dec. 6, 2012.
EP 14161306.7 Extended European Search Report, dated Sep. 26, 2014.
EP 15156680.9 Extended European Search Report, dated Jun. 17, 2015.
"Step-up Authentication for CA SiteMinder," Jan. 1, 2013, pp. 1-2, XP055193570.

* cited by examiner

METHODS OF AUTHENTICATING USERS TO A SITE

BACKGROUND OF THE INVENTION

1. Field of the Invention

The present invention relates generally to the field of authentication and more particularly to user authentication within federated computing systems.

2. Related Art

Passwords, one-time-passcodes (OTPs), image selection, biometrics and other methods are commonly used to authenticate users before providing access to sites or other services including online accounts, physical spaces and those provided person-to-person. The Internet and private networks provide users with access to multiple services offered by distinct service providers each requiring independent authentication of users. Typically, a user is required to provide a username/password pair to identify the account to the service provider. The requirements for username/password pairs vary among service providers. The condition has led to users having multiple distinct username/password pairs that must be remembered and kept secret by the user.

It is generally accepted that a username/password pair identifies the user in addition to identifying the account. The username/password pair may identify the user if the username/password pair is only known to the user and the authenticating system. In the presence of a compromised username/password pair, only the account is identified. Other users and particularly criminal users can abuse the account and services provided if they gain knowledge of the username/password. Additional methods of authentication have been created to prevent unauthorized access to accounts and services. These include biometrics and identification of devices to name a few.

Using combinations of the methods lead to additional methods. For instance, using voice and face biometrics can lead to fusion methods in which the independent results of voice and face recognition are processed to derive another measurement. There are many methods, modalities, etc. that can be used for authenticating users. The methods for authenticating a user are commonly based on one or more authentication factors, the most common being 1) something the user knows, 2) something the user has, 3) something the user does, and 4) something the user is. Other categories may exist.

A username/password pair is an example of "something the user knows." Another example of "something the user knows" includes answering a question such as: what was the last charge on your credit card? If a username/password pair is used exclusively to authenticate a user, it is described as a single-factor authentication. Likewise, if a fingerprint is used exclusively to authenticate a user, it is described as a single-factor authentication.

If more than one factor is used to authenticate a user, the authentication is described as multifactor. For instance, username/pas sword and an OTP sent to a user's cellular phone that must be transcribed and sent to the authenticating system are described as a multifactor authentication. In this example, the multifactor authentication includes "something the user knows" (username/password) and "something the user has" (a cellular phone). It is thought to be more difficult for criminals to compromise accounts/sites that require more than one factor. Therefore, the factors and the number of factors applied to an authentication indicate the strength of authentication. It follows that users and service providers require/desire different authentication methods to better secure some servers, services and sites. Simultaneously, users and service providers require/desire more convenient authentication methods for other servers, services and sites.

Users that require/desire access to multiple services offered by multiple vendors often must know multiple credentials and be familiar with multiple authentication methods. For instance, a tablet may require a fingerprint scan, while the phone may require a passcode and a username/password, while a Personal Computer (PC) connected to the Internet may require a username/pas sword and an OTP for some collection of services. To simplify the authentication tasks in multi-service environments, services can trust the authentication performed by another service and avoid inconveniencing the user with additional authentication. For instance, logging into a corporate network often employs a username/password provided to a trusted authentication server. The user does not need knowledge of the particular trusted server providing the authentication. Once authenticated, the user may be authorized to use services provided by other servers that trust the authentication. When the user attempts to access a service available on the exemplary corporate network, the service contacts the authenticating server and verifies the user authentication. If the user has been authenticated, the user may be permitted to access the service. Otherwise, the user may be authenticated by the service or a trusted authentication server.

Networked environments comprising multiple servers that trust the authentication provided by other servers are described as federated. There exist a number of standards, protocols and implementations of federated authentication systems including: the Microsoft Security Token Service, OpenID Connect, Shiboleth, etc. Federated authentication systems operate within a trust framework comprising one or more authentication servers that provide results relied upon by another party. The authentication servers are known as Identity Providers (IPs). The consumers of the authentication results are known as Relying Parties (RPs). A server, service or site can be both an IP and an RP.

Federated authentication systems can simplify the user environment by providing the user with the choice of using a single authentication service. Users can select a single authentication server, authenticate once and have access to multiple services. This benefit is commonly referred to as Single Sign-on (SSO). Federated authentication systems provide varying methods of authentication that can often be selected by the user. For instance, a user may choose to use multifactor authentication including a username/password and OTP. Such a choice reflects a user's willingness to endure additional inconvenience (they must have their phone) in exchange for greater perceived security (use of additional factors). Once authenticated, however, the user gains access to services offered by servers in the federation. The user may be prompted to identify themselves to other servers participating in the federation. Therefore authentication servers provide a federated identity to users.

It should be appreciated that while federated authentication servers offer varying authentication methods, the user must select one. For instance, if a user chooses username/password for their authentication method to their federated authentication server, the authentication is valid for all servers, services and sites participating in the federation. In other words, the authentication applies equally to the user's bank account and the user's social media account. Because of this, savvy users may opt to authenticate with strong methods or authenticate separately to high-value accounts; both inconvenient to the user.

SUMMARY

The present invention provides methods for authenticating a user to multiple servers within a federated computing system. An exemplary method that can be performed, for example, by a first server comprises receiving, with the first server, a first claimant target for the user and, in response, authenticating the user to the first server according to a first authentication method. After authenticating the user, the method further comprises receiving with the first server from a second server an authentication request including a site identifier and a second claimant target, and then sending to the second server an indication of successful authentication. Some embodiments further comprise enrolling the user before receiving the first claimant target. Enrolling the user can comprise creating a record for the user, where the record stores a user ID for the user and further stores an association between an identity of the first authentication method and of the first server. In some embodiments, the step of enrolling the user can permit the user to select from between multiple authentication method choices, and therefore the method can also comprise receiving a user selection of the first authentication method.

In various embodiments, the step of authenticating the user to the first server includes determining the first authentication method so that an appropriate authentication method will be used. Determining the first authentication method, in some embodiments, can include selecting the first authentication method from a plurality of authentication methods identified in a record for the user, such as where the user is offered a choice of possible authentication methods. In other embodiments the first server is in communication with a client computing device employed by the user, and in these embodiments the step of determining the first authentication method can includes identifying the client computing device in order to employ an authentication method that is supported by the client computing device.

If the user seeks to authenticate with a second server after authenticating with the first server, the exemplary method provides alternatives that depend on whether the second server can be accessed using an authentication method that the user has already performed during the session. For example, where the user has authenticated previously during the session with the first authentication method but the first authentication method is not an acceptable option for the second server, the exemplary method further comprises using the second claimant target to locate a record for the user, to select a second authentication method stored in association with the site identifier in the record, and to authenticate the user according to the second authentication method. However, in a situation where the user has authenticated previously during the session using the first authentication method and the second server can accept the first authentication method, the exemplary method further comprises using the second claimant target to locate a record for the user, determining that the first authentication method is stored in association with the site identifier in the record, and determining that the user had previously been authenticated according to the first authentication method, which may be indicated by a flag, for example. Upon the determination that an appropriate authentication method has been completed, either presently for the desired server or previously during the session for another server, an indication of successful authentication is sent to the second server.

The present invention also provides a federated computing system. An exemplary federated computing system comprises a database, an authentication server, and at least one relying party server. The database is stored on a non-transitory storage medium, and includes a record for a user. The authentication server is configured to receive a first claimant target for the user, authenticate the user according to a first authentication method, and after authenticating the user, to receive an authentication request including a site identifier and a second claimant target. Each relying party server is in communication with the authentication server across a network, and each is configured to send an authentication request, including its site identifier and a claimant target, to the authentication server and to receive an indication of authentication back from the authentication server.

In various embodiments of the federated computing system, the authentication server is further configured to use the second claimant target to locate a record for the user in the database, to select a second authentication method stored in association with the site identifier in the record, and to authenticate the user according to the second authentication method. In other embodiments, the authentication server is further configured to authenticate the user by determining the first authentication method, where determining the first authentication method includes using the second claimant target to locate the record for the user in the database, determining that the first authentication method is stored in association with the site identifier in the record, and determining that the user had previously been authenticated according to the first authentication method. In still other embodiments, the authentication server is further configured to determine the first authentication method, before authenticating the user according to the first authentication method, by selecting the first authentication method from a plurality of authentication methods identified in a record for the user. In still further embodiments, the first server is in communication with a client computing device employed by the user, and in these embodiments the step of determining the first authentication method can include identifying the client computing device so that an authentication method appropriate to the client computing device can be employed.

DETAILED DESCRIPTION OF THE INVENTION

The present invention provides methods for simplifying user authentications within federated computing systems, and to computing systems that implement these methods. In a given session, a user can be authenticated multiple times by different authentication methods to access services from different servers of the federated computing system, however, once the user has been authenticated during the session by a particular authentication method, the user need not repeat that method in order to access further servers that permit authorization through that authentication method.

Systems of the present invention comprise a plurality of servers, one authentication server and a number of relying party servers configured to communicate with the authentication server across a network. The authentication server maintains authentication records for users of the federated system, where each record stores various associations that indicate which authentication methods are used to authenticate a given user to the various relying party servers. Optionally, users can select which authentication method may be used for accessing the various relying party servers. Optionally, for a particular relying party server, the appropriate authentication method will depend on the type of client computing device the user employs to seek access. When a user seeks access to a particular relying party server for the first time during a session, the relying party server sends identifiers for both the user and the relying party server to the authentication server, and the authentication server then determines whether the user has already been authenticated to another federated server according to the authentication method required by the current relying party server. If so, the authentication server indicates to the current relying party server that the user is authenticated, else the authentication server invokes the necessary authentication method. Upon completion, the authentication server indicates to the current relying party server that the user is authenticated.

Figure 1:
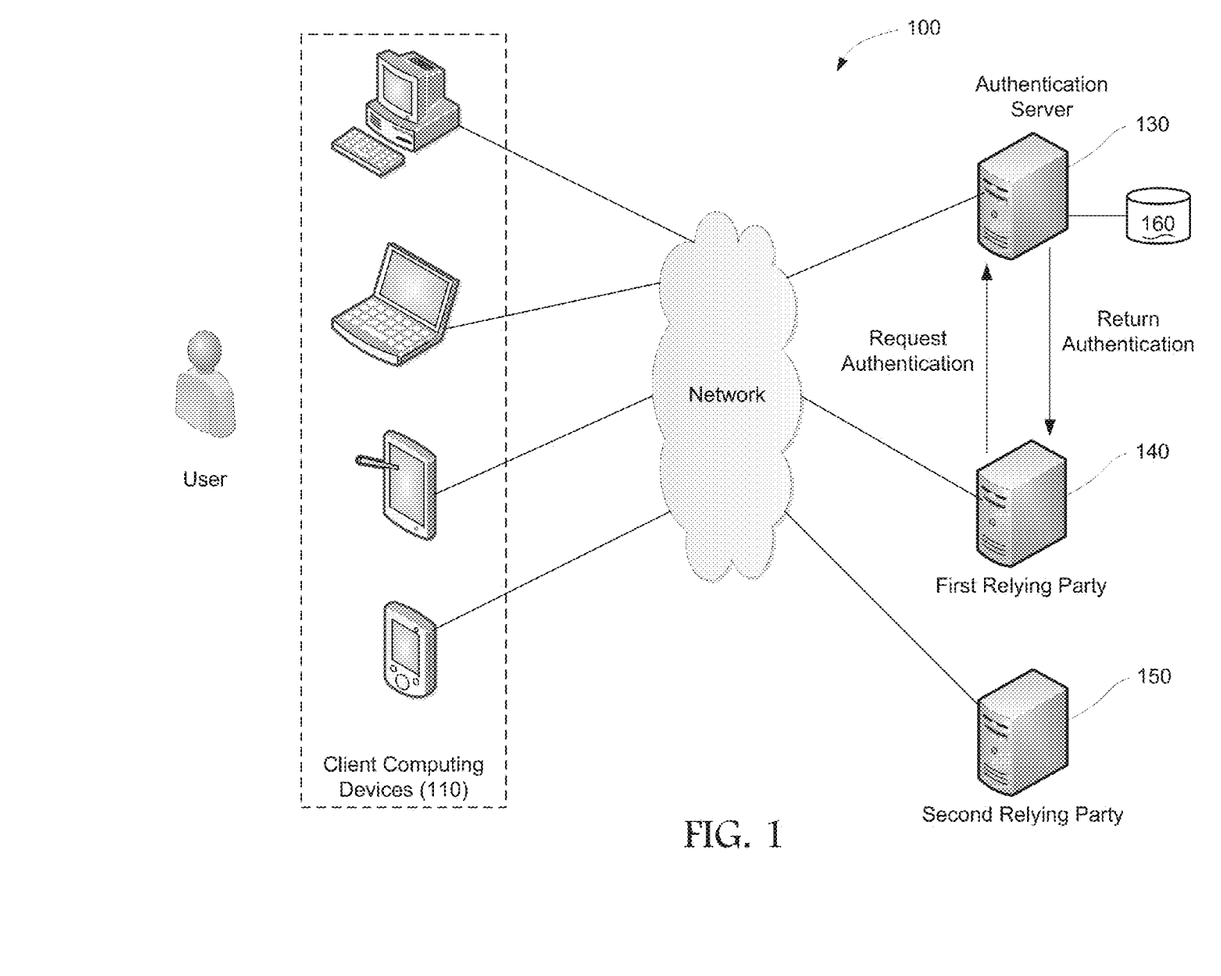
FIG. 1 is a schematic representation of a federated computing system according to an exemplary embodiment of the present invention.

FIG. 1 schematically illustrates the components of a federated computing system 100. The federated computing system 100 comprises a plurality of client computing devices 110 configured to communicate across a network 120, such as the Internet or a cellular phone network, with an authentication server 130 and with one or more relying party servers. In the example of FIG. 1, two relying party servers are illustrated, a first relying party 140 and a second relying party server 150. A user is able to access various relying party servers 140, 150 using the client computing devices 110 in order to obtain services therefrom. As shown in FIG. 1, each of the relying party servers 140, 150 is configured to communicate across the network 120, or another network (not shown), with the authentication server 130 in order to pass authentication requests and results therebetween. The authentication server 130 and the relying party servers 140, 150 are collectively referred to herein as the federated servers.

Exemplary client computing devices 110 include laptop computers, desktop computers, tablet computing systems, and smartphones. Client computing devices 110 are configured with one or more web browsers that enable the user to view and interact with content provided by the federated servers. A session, as used herein, refers to a limited period of connectivity between a client computing device 110 and one or more federated servers. A session is initiated when a user is first authenticated to a federated server, as discussed below with reference to FIG. 2, and can continue for as long as the user remains logged into at least one federated server. A session ends when either the user logs off from all federated servers or a threshold period of time is exceeded without activity.

The authentication server 130 is configured to manage records for multiple users, where a record for a given user can store associations between the user's federated identity, one or more claimant targets, one or more authentication methods, one or more client computing devices, and one or more site identifiers for various relying party servers such as relying party servers 140, 150. Such records can be stored in a database 160 comprising a non-transitory storage medium, like magnetic or optical storage, in communication with the authentication server 130.

Figure 2:
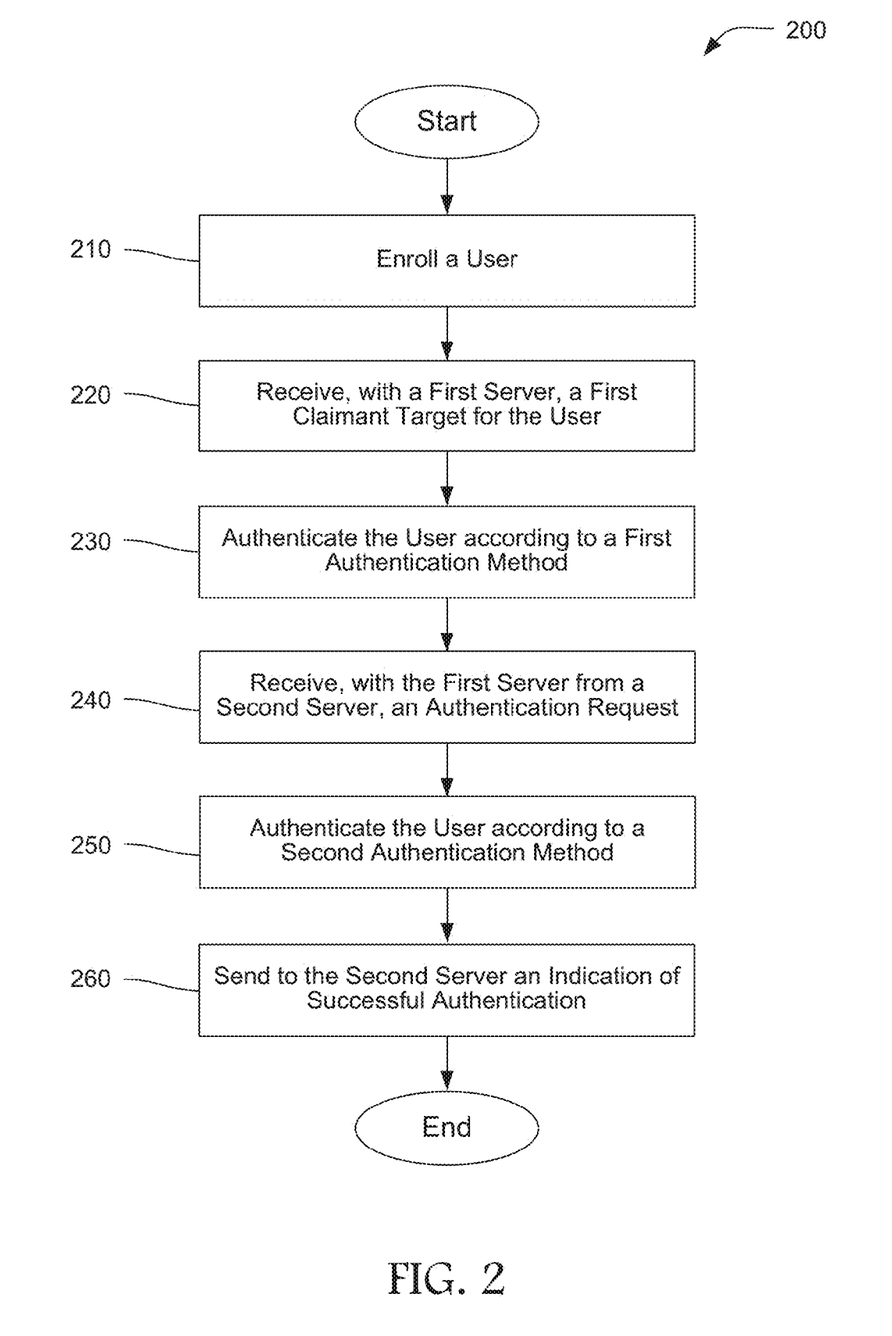
FIG. 2 is a flowchart representation of a method for user authentication within a federated computing system, according to an exemplary embodiment of the present invention.

An exemplary method 200 of the invention is described with reference to FIG. 2. The method 200 allows a user to authenticate to the authentication server 130, for example, using a first authentication method, then later authenticate to a relying party server 140 or 150 either without having to repeat the first authentication, or in the alternative by being authenticated according to a second authentication method. Each time a particular authentication method has been successfully completed during a session, the user does not have to repeat that authentication method when approaching another relying party server 140, 150 of the federated computing system 100, where the other relying party server 140, 150 can be accessed after successfully completing that authentication method. The method 200 can optionally provide customization to the user to select authentication methods for different relying party servers 140, 150 and to employ different client computing devices 110.

In a step 210 of the method 200 a user is enrolled, for example, by authentication server 130 or by a dedicated enrollment server (not shown) in communication with the database 160 shared with the authentication server 130. In the enrollment process, an enrollee user is associated with a unique user ID and a record that including the user ID is created for the user and stored in the database 160. The user ID serves as a federated identity for the user across the servers of the federated computing system 100. The user ID can comprise, for example, a username, a URL, a code stored by a physical card, etc. Information about the user optionally can be collected during enrollment, such as the user's name, phone numbers, addresses, and the like, and stored in the record of the database 160.

During the enrollment process of step 210, the user can be prompted to set up at least one authentication method that can be subsequently used to authenticate the user to the authentication server 130. The user optionally can also set up other authentication methods that may be required to access one or more relying party servers 140, 150, or these additional authentication methods can be addressed at a later time. In some embodiments the user enrolls in step 210 by employing an application running on a client computing device 110 that communicates with the authentication or enrollment server. In other embodiments, the user employs a browser running on a client computing device 110 to access a website served by the authentication or enrollment server to enroll in step 210. The same application or website can be employed by the user to return at a later time to make changes to the record in the database 160. Such changes can include associating authentication methods to relying party servers 140, 150 that were not previously addressed, changing which authentication methods are associated to particular relying party servers 140, 150, and specifying rules such as that the same authentication method cannot be repeated for the same federated server in successive sessions.

Exemplary authentication methods can require the use of an OTP, the user's biometrics, username/password pairs, and so forth. Exemplary authentication methods can be single factor or multi-factor, and can be single channel or multi-channel. Examples of multi-factor authentication methods are illustrated by U.S. Pat. No. 8,006,291 issued on Aug. 23, 2011 and U.S. Pat. No. 8,516,562 issued on Aug. 20, 2013, both entitled "Multi-Channel Multi-Factor Authentication," and by U.S. Pat. No. 8,536,976 issued on Sep. 17, 2013 and entitled "Single-Channel Multi-Factor Authentication," all three of which are incorporated by reference herein.

The possible authentication methods that can be used in conjunction with the present invention span a wide range of strengths. Authentication methods can be categorized by their strength-of-authentication, for example, by a numerical score or a relative ranking such as "low," "medium," or "high." In some embodiments, access to a given federated server, or to a service provided by the federated server, will require an authentication method that meets a minimum strength-of-authentication level. In these embodiments, when associating an authentication method to a federated server during the enrollment step 210, an authentication method that meets the minimum strength-of-authentication may be automatically selected for the user, such as where only one authentication method is available with the required strength. In other instances, the user can be given an opportunity to select from a number of authentication methods that meet the minimum requirements. In these embodiments, the user can be presented with the authentication methods and their associated strengths, and the authentication or enrollment server will receive the user selection and store the selection in the dedicated record for the user.

Further user customizations that can be selected, in some embodiments, include the ability to select more than one authentication method to associate with a federated server. Where several authentication methods are associated with a given federated server, the user can further select to have a different authentication method used for each new session, by rotation through an order or by random selection, for example. In some embodiments, the user can opt to be given the choice, at the time authentication is requested, as to which authentication method, of several with sufficient strength, to employ for that session.

For each authentication method selected, additional steps may be required. Setting up an authentication method that employs an OTP can include, for example, receiving from the user a cellphone number that will be used to transmit OTPs to the user during subsequent authentications. The cellphone number is then stored in association with an identifier for the OTP authentication method in the record for the user. Similarly, an authentication method that employs a username/password pair would have the user establish a unique username/password combination and store the same in the record for the user in association with an identifier for that authentication method. In these embodiments, the username may be the same or different than the user ID. In both examples, a claimant target is established for the authentication method. As used herein, a claimant target comprises information that serves to indicate the identity sought to be authenticated and is used by the authentication server 130 to locate the appropriate record for the user from the database 160 and can take many forms including the user ID, a username, a biometric such as an image of the user's face, a fingerprint scan, and the like.

Setting up an authentication method that employs a biometric can include, for example, having the user provide a biometric response that is stored as a biometric template in the record for the user in association with an identifier for the authentication method. During authentication, a biometric response from the person seeking to be authenticated is compared to the biometric template to determine whether a sufficient match exists. Again, a claimant target is established for the authentication method and stored in the record for the user in association with the authentication method.

As noted above, one or more authentication methods can be established for one or more relying party servers 140, 150. When this data collection is performed as part of step 210, an association can be stored in the record for the user that associates the relying party server 140, 150 to an identifier for any authentication methods selected for that relying party server 140, 150. Establishing an authentication method for a particular relying party server 140, 150 can comprise, in some instances, allowing the user to select the authentication method from a list of suitable alternatives, or can comprise assigning an authentication method that is universally employed for the given relying party server 140, 150. Establishing the authentication method for a given relying party server 140, 150 can also comprise determining a client computing device 110 to be used during a subsequent authentication. Thus, enrollment in step 210 can also include storing in the record an association between a relying party server 140, 150, a particular client computing device 110, and an authentication method such that during a subsequent authentication the proper authentication method for the given relying party server 140, 150 and the correct client computing device 110 can be employed.

It will be appreciated that step 210 is an optional step in as much as enrollment can be performed by a third party, in some embodiments. In these embodiments, methods of authenticating users assume the pre-existence of a record for the user in the database 160, as described above. These embodiments can begin, instead, at step 220 which is directed to receiving a first claimant target by the authentication server 130. Embodiments that begin with enrollment in step 210 continue with step 220. In step 220 the user can submit a claimant target from one of the client computing devices 110 over a communication channel through the network 120 to the authentication server 130. For instance, the user can access a login webpage using a web browser running on the client computing device 110, where the webpage prompts the user to provide a claimant target. In this way, the authentication server 130 receives the first claimant target from the client computing device 110.

In a step 230 the authentication server 130 authenticates the user according to a first authentication method. The authentication server 130 can perform this step by searching the database 160 for the record for the user, using the claimant target to search the database 160 and locate the record. Having located the appropriate record, the authentication server 130 can authenticate the user according to the authentication method since the record provides the information needed to determine authenticity under the first authentication method, such as a password that matches the username, or a biometric template. In some embodiments, the authentication server 130 first locates the appropriate record, then determines the authentication method to be used. For example, the record may associate the authentication server 130 with identifiers for a plurality of authentication methods, and the authentication server 130 selects one of the plurality to use to authenticate the user for the session. The authentication server 130 can select randomly from the plurality, or select according to a set order, or select according to an order specified by the user during the enrollment step 210. In still further embodiments, the authentication step 230 includes identifying a client computing device 110, and then selecting the authentication method associated in the record for the user with the identified client computing device 110. The identity of the client computing device 110 can be determined, for example, based on the communication channel or an IP address of the client computing device 110, in various embodiments.

Once the appropriate authentication method has been selected in step 230, the authentication server 130 invokes the method. Invoking the authentication method will depend on the nature of the authentication method. For example, if the authentication method employs an OTP, invoking the authentication method can comprise determining a phone number from the record for the user, generating the OTP, sending the generated OTP to the determined phone number over a first channel, and receiving the OTP back over a second channel within a time threshold. Invoking the authentication method can likewise comprise sending a prompt to a client computing device 110 and receiving a response therefrom.

Once the user is authenticated according to the first authentication method, an indicator such as a flag can be set in the record to indicate that the user has been successfully authenticated according to that authentication method. Additionally, a session is established by the authentication server 130 and assigned a session identifier. Information pertaining to a given session can be stored in the record for the user, or a separate record, in various embodiments, and can include a time stamp to indicate when the session began. As discussed further below, once the user is authenticated according to the first authentication method for the authentication server 130, the user need not repeat the same authentication method in order to access a relying party server 140, 150 that requires the first authentication method, but may have to perform a different authentication method. All such indicators for successful authentications are cleared at the end of the session. Optionally, the user can specify authentication always be performed for a site even if previously authenticated in a session.

In a step 240, that follows step 230, the authentication server 130 receives from a relying party server 140, 150 an authentication request. The authentication request can be triggered by the user attempting to access services from the relying party server 140, 150 using a client computing device 110 which can be the same or different than the client computing device 110 used in preceding steps. The relying party server 140, 150 can receive a claimant target, such as those discussed above, from a client computing device 110 by prompting the user, for example. Each relying party server 140, 150 has a unique site identifier, and when a relying party server 140, 150 sends an authentication request, the authentication request includes both the site identifier and the second claimant target. The authentication server 130 receives such an authentication request in step 240.

In step 240 the authentication server 130 also locates the record for the user, as the record includes the second claimant target, which optionally may be the same as the first claimant target. From the record in database 160, the authentication server 130 determines whether the relying party server 140, 150 identified by the authentication request is associated with an authentication method, and if so, determines whether the user has already been authenticated to another federated server using that authentication method. If so, the method 200 advances to a step 260 in which the authentication server 130 can send to the relying party server 140, 150 an indication of successful authentication and the user does not have to repeat the steps of the authentication method. In still further embodiments, the relying party server 140, 150 identified by the authentication request is associated with a minimum strength-of-authentication level. If the user had previously, during the session, been authenticated by any authentication method meeting the minimum strength-of-authentication level then the authentication server 130 can send to the relying party server 140, 150 an indication of successful authentication.

If an authentication method is associated with the relying party server 140, 150, but the user has not already been authenticated by that authentication method during the session, then in a step 250 the authentication method required by the record for the user is invoked by the authentication server 130. Upon successful authentication with this second authentication method, an indicator can be set in the record for the user so that the second authentication method need not be repeated subsequently during the session. Again, in step 260 the authentication server 130 can send to the relying party server 140, 150 an indication of successful authentication.

If an authentication method is not associated with the relying party server 140, 150 that the user seeks to access, in some embodiments the authentication server 130 automatically assigns an appropriate authentication method for the user to access the relying party server 140, 150, stores an indication of that authentication method in the record for the user in association with an indication of the identity of the relying party server 140, 150, and then invokes that authentication method. In other instances the user is prompted to select the authentication method from a list of acceptable methods, where the authentication server 130 then receives the selection, stores an association of the selection to the relying party server 140, 150 in the record for the user, and invokes the authentication method to authenticate the user. In still further embodiments, the user can also specify that the association should not be stored in the record so that in a future session, should the user seek to access the same relying party server 140, 150, the user would have to again select an authentication method from the list.

In still further instances, the user can seek to access a relying party server 140, 150 for which no authentication method has been established for the user. In these instances the authentication server 130 can receive, in step 240, an authentication request specifying the site identifier and the second claimant target, and can then locate the record for the user, but would not find an authentication method for both the user and the relying party server 140, 150. The authentication server 130 can send the relying party server 140, 150 an indication that authentication failed, in these situations. The user can be required to return to enrollment in step 210, in some embodiments.

In still other embodiments of the method 200, the user first seeks authentication from a relying party server 140, 150. In these embodiments, the relying party server 140, 150 sends an authentication request comprising a site identifier and the claimant target to the authentication server 130. In the step 220 the authentication server 130 receives this first claimant target. Then, in step 230, the authentication server 130 locates the record for the user using the first claimant target to search the database, determines the appropriate authentication method for the relying party server 140, 150 and then invokes that authentication method to authenticate the user. The authentication server 130 also opens a session and assigns a session identifier. Method 200 can continue with the user seeking to authenticate with another relying party server 140, 150, and in a step 240 the authentication server 130 receives from the other relying party server 140, 150 another authentication request including the site identifier of the other relying party server 140, 150 and second claimant target from the user. The second authentication can progress as described above in step 250, resulting in the authentication server 130 sending to the other relying party server 140, 150 an indication of successful authentication in step 260.

While the session remains open, the user can continue to use different client computing devices 110 to access different federated servers, and the authentication server 130 will loop through step 240-260. The method 200 ends when the session ends, either by the user logging off of each federated server that had been accessed during the session, else by timing out. The user can time out by not interacting with any federated server for more than a threshold period of time, such as 30 minutes. The authentication server 130 can query other federated servers periodically to determine whether the user has been active or not. Even if a user has been active, in some embodiments, the user may still time out by exceeding a maximum session duration, such as 8 hours.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A method for authenticating within a single sign-on federated authentication system, the method comprising:
   enrolling a user, including creating a record for the user, the record storing a user ID for the user and storing an association between a site identifier for a first server and a first authentication method, and storing a further association between a site identifier of a second server and each of a second authentication method and a third authentication method;
   after enrolling the user, receiving, with the first server, a first claimant target for the user;
   authenticating the user to the first server according to the first authentication method;
   after authenticating the user to the first server, receiving with the first server from a second server an authentication request including the second site identifier and a second claimant target, wherein the first and second claimant targets each consist of one of the user ID, a username, or a biometric;
   again authenticating the user according to a second authentication method including using the second claimant target to locate the record for the user, then
      selecting the second authentication method from between the second and third a plurality of authentication methods associated with the second site identifier in the record for the user, then
      authenticating the user according to the selected second authentication method including receiving a response from the user; and
   sending to the second server an indication of successful authentication.

2. The method of claim 1 wherein enrolling the user comprises
   receiving a user selection of the first authentication method.

3. The method of claim 1 wherein authenticating the user to the first server includes determining the first authentication method.

4. The method of claim 3 wherein determining the first authentication method includes selecting the first authentication method from a plurality of authentication methods identified in the record for the user.

5. The method of claim 3 wherein the first server is in communication with a client computing device employed by the user and wherein determining the first authentication method includes identifying the client computing device.

6. A system for authenticating within a single sign-on federated authentication system, the system comprising:
   an enrollment server configured to enroll a user, wherein enrolling the user includes creating a record for the user, and storing in the record a user ID for the user, and storing in the record an association between a site identifier for a first server and a first authentication method, and storing in the record a further association between a site identifier of a second server and each of a second authentication method and a third authentication method;
   a database, stored on a non-transitory storage medium, the database including the record for the user;
   an authentication server configured to:
      after enrolling the user, receive a first claimant target for the user,
      authenticate the user according to the first authentication method, after authenticating the user to the authentication server, receive an authentication request including the second site identifier and a second claimant target, wherein the first and second claimant targets each consist of one of the user ID, a username, or a biometric,
   authenticate the user again according to a second authentication method
      including using the second claimant target to locate the record for the user in the database, then selecting the second authentication method from between the second and third a plurality of authentication methods associated with the second site identifier in the record, then authenticating the user according to the selected second authentication method, including receiving a response from the user; and a relying party server in communication with the authentication server across a network, the relying party server configured to send the authentication request to the authentication server and to receive an indication of authentication from the authentication server.

7. The system of claim 6 wherein the authentication server is further configured to determine the first authentication method by selecting the first authentication method from a plurality of authentication methods identified in the record for the user.

8. The system of claim 6 wherein the first server is in communication with a client computing device employed by the user and wherein determining the first authentication method includes identifying the client computing device.

* * * * *